June 29, 1926.
R. W. McLEAN
1,590,305
COTTON SEED HULLER
Filed Feb. 3, 1926
4 Sheets-Sheet 3
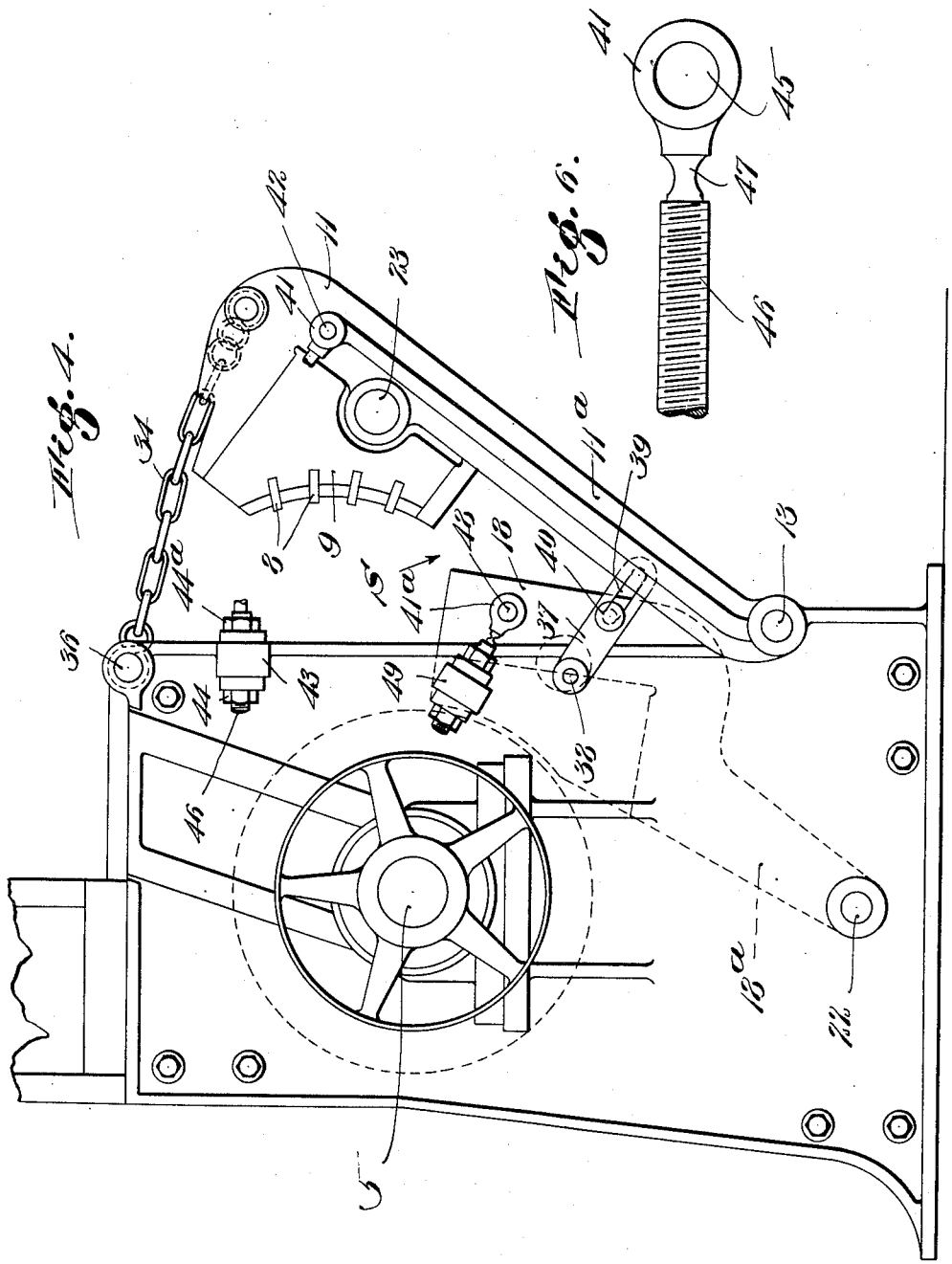

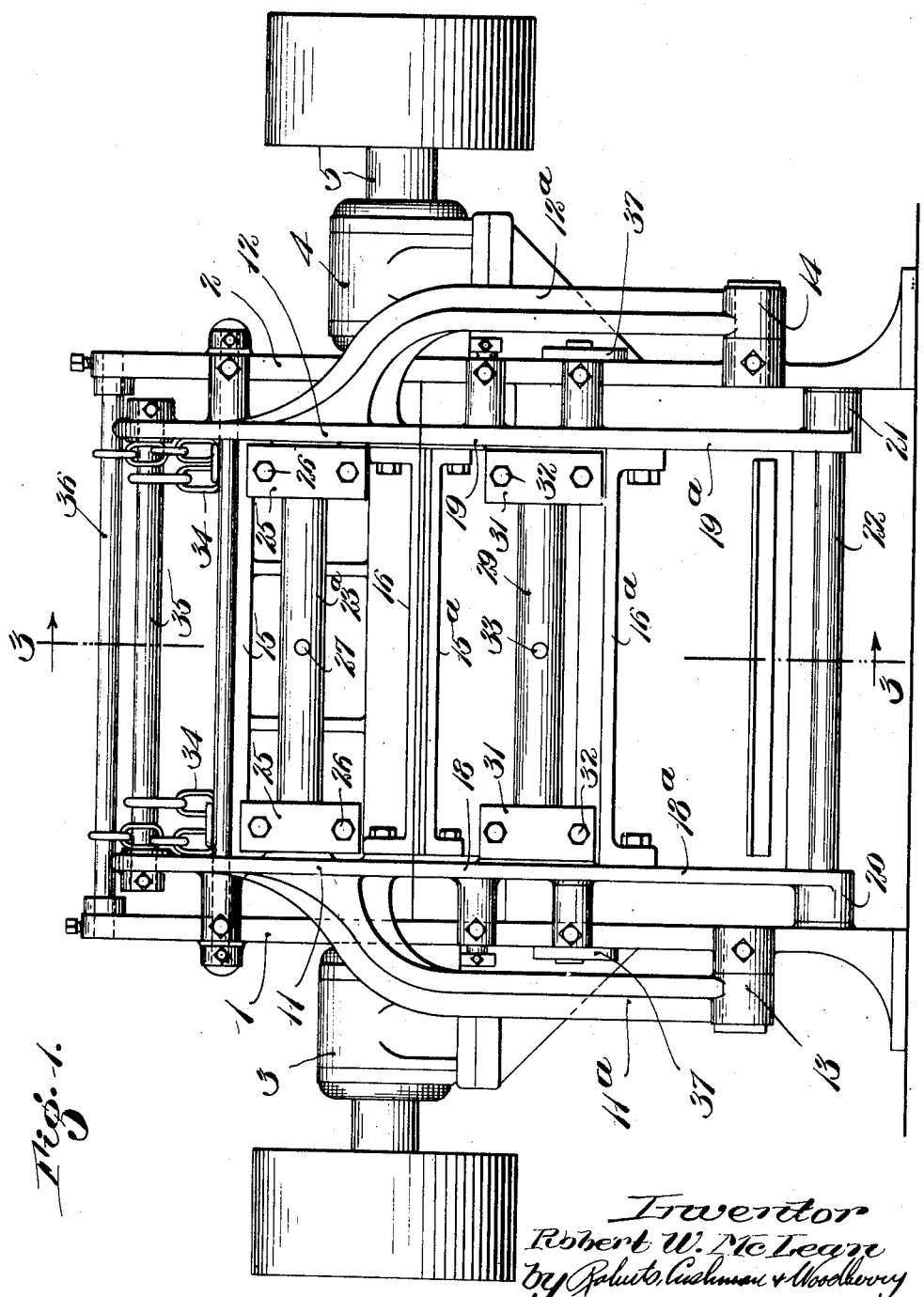

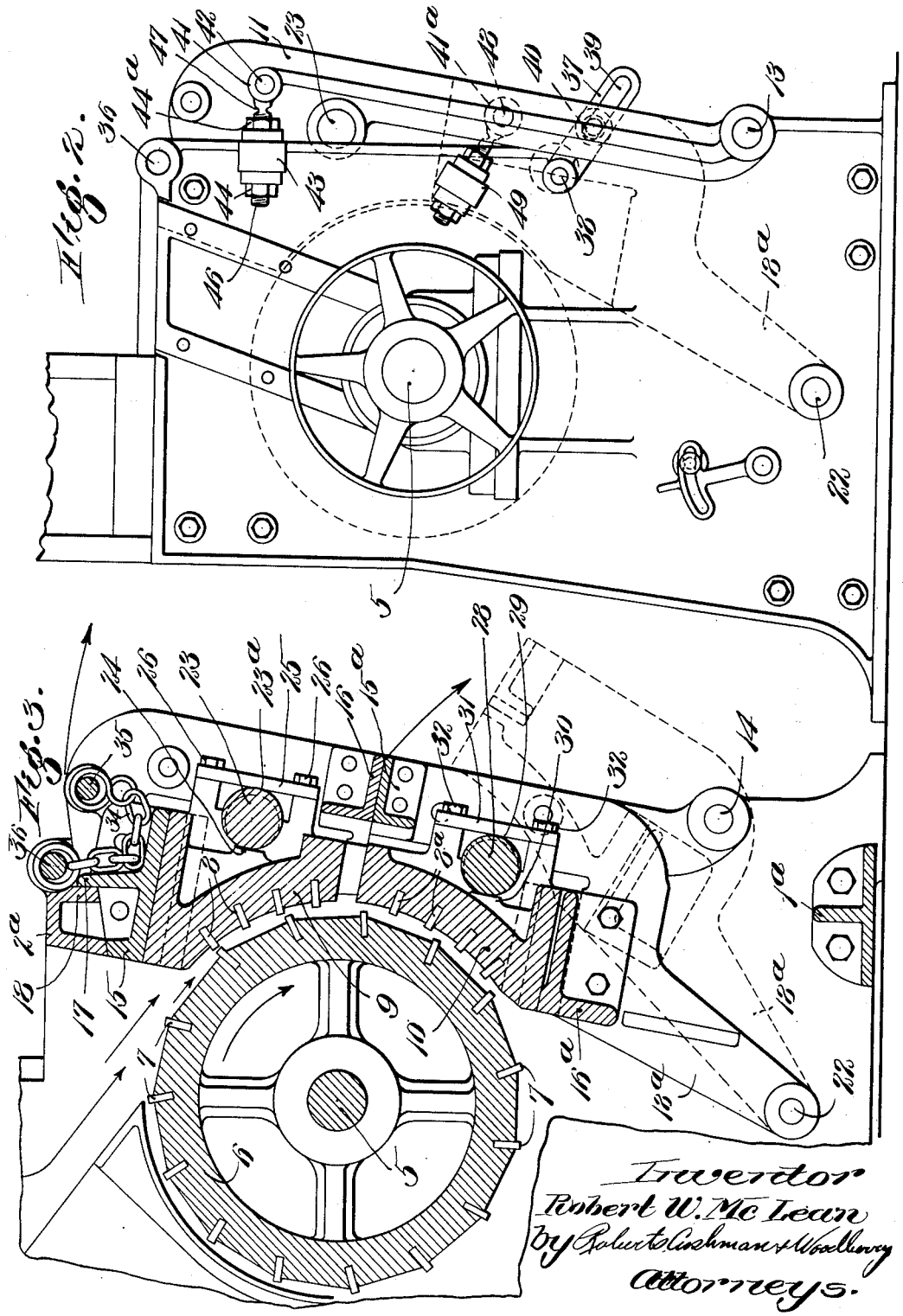

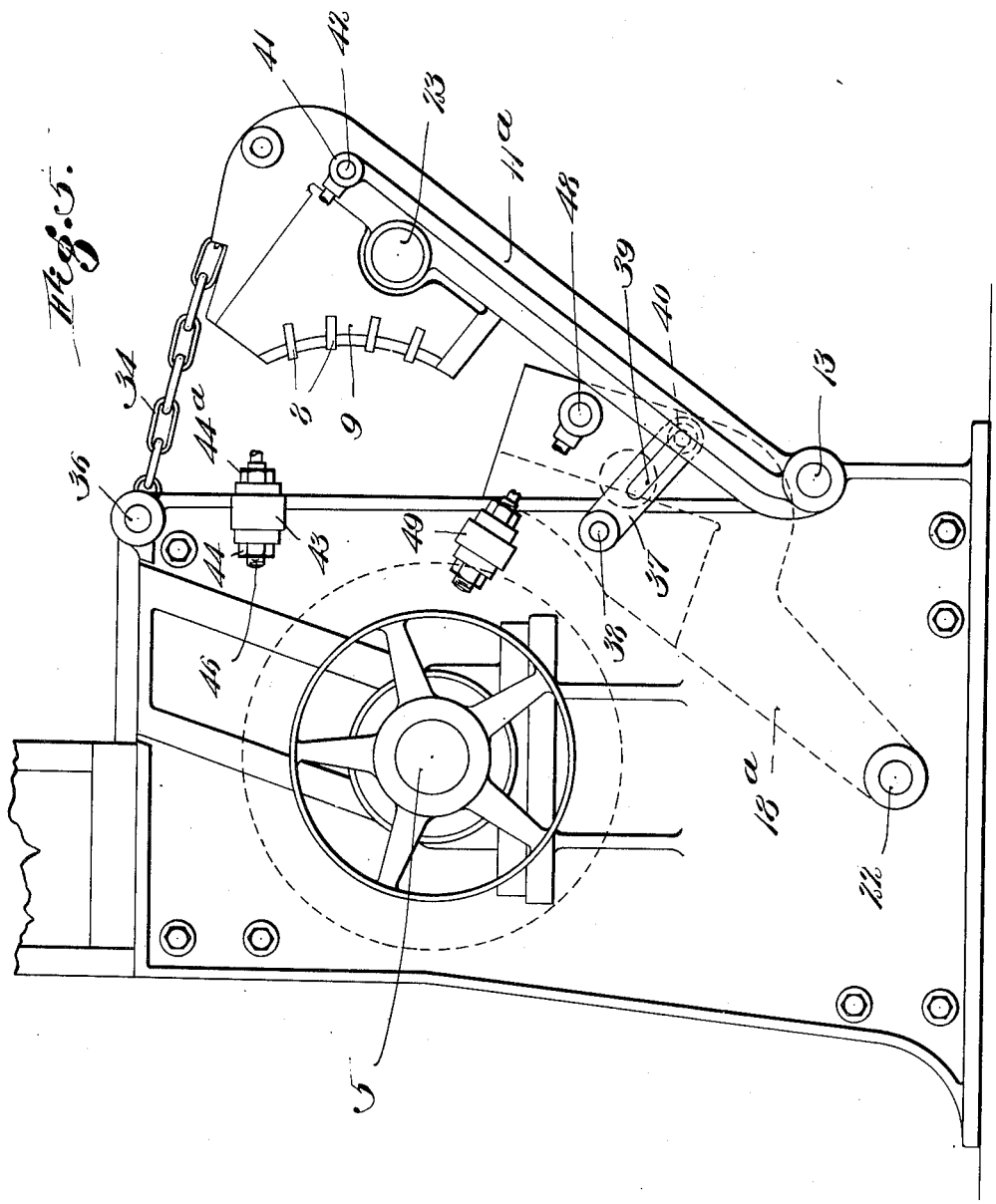

Patented June 29, 1926.

1,590,305

UNITED STATES PATENT OFFICE.

ROBERT W. McLEAN, OF BRIDGEWATER, MASSACHUSETTS, ASSIGNOR TO CARVER COTTON GIN COMPANY, OF EAST BRIDGEWATER, MASSACHUSETTS, A CORPORATION OF MASSACHUSETTS.

COTTONSEED HULLER.

Application filed February 3, 1926. Serial No. 85,684.

This invention pertains to cotton seed hullers of the general type disclosed in my Patent No. 1,079,657 dated November 25, 1913, and the present invention relates to further improvements in the device of said patent. In my patent aforesaid I disclosed a rotary knife carrying cylinder and a single concave cooperating therewith, and to permit the concave to retreat from the cylinder when metallic or other hard objects accidentally intrude between them I mounted the concave upon a pivoted support and normally maintained the concave in operative position by means of a frangible element, for example a metallic link having a weakened zone which facilitates its breakage under abnormal stress.

While this patented arrangement has proven very useful for the purpose intended, I have discovered that somewhat better results may be obtained by dividing the concave into two or more sections and pivotally supporting each section independently of the other or others, employing frangible retaining means for each individual section of the concave.

This division of the concave makes each individual part very much lighter in weight than the single concave previously employed so that the inertia of each part is less and it thereby responds more quickly to the strain imposed by the fortuitous intrusion of metallic particles between the cylinder and concave. When it is considered that the cylinder of such a machine may be 18 inches or more in diameter, weighs upwards of a ton, and runs at speeds of the order of 1000 R. P. M. it is evident that that permissive time interval for the separation of the concave from the cylinder is extremely short, if damage is to be avoided. With the single concave disclosed in my prior patent, I have found that the lower edge of the concave is sometimes chipped or broken, this edge being the nearest to the pivot point, showing that the outward movement of the concave is not quite rapid enough in all cases to provide the necessary space between it and the cylinder for escape of the foreign material.

On the other hand, by dividing the concave in accordance with the present invention, I find that the uppermost section of the concave responds so quickly and readily when a metallic part accidentally enters between it and the cylinder that no damage to such section is apparent even after severe and repeated tests, and that usually the intruding substance is thrown out by centrifugal action and follows the upper concave section thus escaping without contacting with the lower section or sections of the concave. While this is the usual action and while it might thus be permissible to support the lower section or sections rigidly, I prefer to mount all of the sections upon pivotal or other movable supports adapting them to move away from the cylinder, and normally to retain all of said concave sections in operative position by means of frangible or equivalent elements.

While I have divided my concave as above described, into several independently movable sections for the purpose primarily, of safeguarding the mechanism against injury, I find that a further advantage is to be gained by such division in that it enables me to adjust each section of the concave independently of the others and thereby to obtain a finer setting of the machine than usual, with consequent increase in efficiency of operation.

In the accompanying drawings I have illustrated one preferred embodiment of the invention by way of example, and in such drawings;

Fig. 1 is a front elevation of the machine with its parts in operative or normal position;

Fig. 2 is an end elevation of the machine with the parts as shown in Fig. 1, and viewed from the left hand side of the latter figure;

Fig. 3 is a fragmentary, vertical section to larger scale on the line 3—3 of Fig. 1;

Fig. 4 is a view similar to Fig. 2, but showing the upper concave section in the inoperative position which it may assume when a hard substance has intruded between it and the cylinder.

Fig. 5 is an end elevation similar to Fig. 2, but showing both of the concave sections in inoperative position; and Fig. 6 is a fragmentary side elevation of a frangible bolt or link useful in retaining the concave sections in operative position.

Referring to the drawings the numerals 1 and 2 denote respectively the left and right hand side members of the machine frame. These side members are held in suitably spaced relation by rods or girders of any suitable type, two such girders being indicated at 1ª and 2ª respectively in Fig. 3.

The machine frame supports a pair of bearings 3 and 4 preferably of anti-friction type in which the shaft 5 is mounted to turn. This shaft may be provided with one or more pulleys for the reception of a driving belt, not shown.

Referring more particularly to Fig. 3 the shaft 5 is shown as supporting the cylinder 6 which extends substantially from one of the side frame members to the other and which is provided with a series of circumferentially spaced blades 7.

Cooperating with the cylinder 6 is a concave which is normally substantially concentric with the cylinder and which is provided with knives 8 and 8ª which cooperate with the knives 7 of the cylinder to produce the desired cutting or hulling action. In accordance with the present invention, and as here illustrated, the concave is divided into two sections 9 and 10 respectively. The upper concave section 9 is supported upon a yoke frame comprising spaced side members 11 and 12, furnished with depending legs 11ª and 12ª respectively. These legs extend downwardly outside of the frame members 1 and 2 and are pivotally mounted at their lower ends upon stub shafts 13 and 14 secured to the frame members 1 and 2 respectively. The side members 11 and 12 of this yoke frame are connected by transverse rails or girders 15 and 16 respectively.

The lower concave section 10 is supported by a second yoke frame having the spaced side members 18 and 19 provided with depending legs 18ª and 19ª respectively. These legs are disposed between the frame members 1 and 2 and are pivotally mounted at their lower ends at the points 20 and 21 upon a shaft 22 which connects the frame member 1 and 2. The side members 18 and 19 of this lower yoke frame are connected by transverse rails or girders 15ª and 16ª respectively. The pivotal axes of the yoke frames are preferably so located that both concaves tend to fall by gravity away from the cylinder. The axes of the yoke frames are parallel to that of the cylinder and in planes substantially tangent to the surface of the respective concaves and the axis of the upper frame is preferably spaced forwardly of and above that of the lower frame.

The side members 11 and 12 of the upper yoke frame are provided with journal bearings for a rotary shaft 23. Substantially the entire shaft 23, except for the portion which turns in its bearings, is eccentric to its axis as shown at 23ª Fig. 3. The eccentric portion of the shaft bears against one or more abutment surfaces 24 upon the upper concave section 9 and the concave is connected to the shaft by means of a pair of plates 25 which engage the forward face of the shaft and which are secured by bolts 26 to forwardly projecting bosses on the concave section 9. As thus arranged rotation of the shaft in its bearings causes the concave section to move toward or from the cylinder, such section sliding in spaced upper and lower guideways provided in the rails 15 and 16.

The lower concave section 10 is likewise mounted to slide in spaced guide-ways in rails 15ª and 16ª, and the lower yoke frame is provided with journal openings for a shaft 28 which like the shaft 23 is eccentric as indicated at 29 at its intermediate portion. This surface 29 bears against one or more abutment surfaces 30 carried by the lower concave section 10 and is constrained to move with the shaft by means of cover plates 31 secured by bolts 32 to bosses projecting forwardly from the section 10. The shafts 23 and 28 may, if desired, be provided with radial openings 27 and 33 respectively for the insertion of suitable rods or wrenches by means of which the shafts may be rotated for adjusting the concave sections.

In order to limit movement of the upper concave and its supporting yoke away from the cylinder, I prefer to provide one or more chains 34 attached at one end to a rod 36 connecting the frame members 1 and 2 and at their other ends to a rod 35 connecting the side members 11 and 12 at the yoke frame. If desired, I may employ similar means for limiting movement of the lower concave section with its supporting frame, but as herein shown, I prefer to provide links 37 pivotally supported at 38 upon the side members 1 and 2 respectively of the machine frame, such links having elongate slots 39 which engage pins 40 projecting from the legs 18ª and 19ª of the lower yoke frame.

To hold the upper concave with its supporting frame in operative position, I prefer to provide a frangible link 41 (see Fig. 6) preferably in the form of an eye-bolt whose head engages a pin 42 projecting from the side member of the yoke frame. Preferably one of these links is secured to each side of the yoke frame although I contemplate that a single link might serve, if positioned centrally. These links or bolts are preferably screw threaded at 46, the screw threaded portion of the bolt passing freely through an opening or boss 43 upon the side frame member of the machine. The bolts are secured in position by means of nuts 44 and 44ª. To prevent movement of the yoke frame inwardly to an undue amount by the adjustment of nuts 44, I prefer to provide a stop member such as the flange 17 carried by the rail 15 of the yoke frame and which engages a part 18 of the girder 2ª.

Preferably the frangible link or bolt 41 is made of some brittle substance for example cast-iron and is provided with a neck 47 of reduced diameter which forms a weakened line facilitating breakage under excess strain.

The lower yoke frame is likewise held in normal position by means of frangible links 41ª secured to bosses 48 on the side members of the lower yoke frame, said links have threaded portions passing through openings in bosses 49 on the members 1 and 2 and being secured therein by suitable nuts in the same way as the bolts 41 above described.

In the normal operation of the machine the parts occupy the position shown in Figs. 1, 2 and 3, and by turning the shafts 23 and 28 the upper and lower concave sections may be adjusted relatively to each other to produce the most efficient operation.

If, during the operation of the machine, a hard or unyielding element, for example a bolt or nut, is accidentally caught between the cylinder and the concave, the blow transmitted to the concave from the cylinder through this hard and unyielding part snaps the bolts 41 and permits the upper concave to drop outwardly to the position shown in Fig. 4, until it is stopped by the chain or chains 34.

When the parts are positioned as shown in Fig. 4, a space S of considerable width, is provided between the lower edge of the upper concave and the upper part of the next lower concave section which permits any foreign material to drop out freely and in most cases the blow imparted to such hard intruding substance is sufficient to throw it outwardly through this space so that it is free of the lower concave section. If however, such hard material should continue around with the cylinder without striking the upper concave it may engage the lower concave section, and in this case the bolts 41ª snap, permitting the lower section to drop as indicated in the dotted lines in Fig. 3 or the full lines in Fig. 5. The foreign substance may thus escape without any substantial damage to the concave.

Under some circumstances as shown in Fig. 5 both concaves may be released so that the machine is always protected from substantial damage and breakage of parts which are difficult or expensive to replace.

When the operator notes that one or both of the concaves have dropped, he removes the broken bolt sections and after restoring the concaves to normal position installs new bolt sections and the machine is again ready for use in a comparatively short time.

While I have herein shown the machine as equipped with two concave sections, I contemplate that I may, under some circumstances, divide the concave into a greater number of sections, supporting each section so that it is free to swing without interference with the others and providing each section with means for retaining it in normal position which will allow it to yield or move away from the cylinder upon the intrusion of a hard and unyielding part.

Although I have shown frangible links as one means for retaining the sections in operative position, I contemplate that other and suitable means may be substituted therefor and I further contemplate that various changes in the arrangements of the parts and in the location of the pivotal or other supports for the concaves may be made as circumstances may indicate to be desirable.

I claim:

1. A machine of the class described comprising a rotary cylinder and a concave co-operating therewith, said concave comprising a plurality of independent sections, a movable support for each section, and readily frangible means normally retaining each support in position to present its concave section in operative relation to the cylinder.

2. A machine of the class described comprising a rotary cylinder and a concave co-operating therewith, said concave comprising a plurality of independent sections, and a pivoted support for each section, the axes of said supports being disposed in planes substantially tangent to the inner surfaces of the respective concaves.

3. A machine of the class described comprising a rotary cylinder and a concave co-operating therewith, said concave comprising a plurality of independent sections, and a pivoted support for each section, the axis of each support being disposed in a plane substantially tangent to a point on the inner surface of its respective concave section intermediate the upper and lower edges of each section.

4. A machine of the class described comprising a rotary cylinder and a concave co-operating therewith, said concave comprising a plurality of independent sections, a pivoted support for each section, and a readily frangible member normally retaining each support in position to present its concave section in operative relation to the cylinder.

5. A machine of the class described comprising a rotary cylinder and a concave co-operating therewith, said concave comprising a plurality of independent sections, a pivoted support for each section, and a frangible link normally retaining each support in operative position, each link having a line of weakness to permit it to break under abnormal strain thereby to release the support.

6. A machine of the class described comprising a rotary cylinder and a concave co-operating therewith, said concave comprising a plurality of independent sections, and a pivoted support for each section, the axes of the supports being so located that each support with its concave section tends to fall outwardly and away from the cylinder, frangible links normally holding the supports in position, and means for limiting outward swing of the supports when released by breakage of the links.

7. A machine of the class described comprising a rotary cylinder and a concave cooperating therewith, the concave comprising an upper section and a lower section, independent means supporting said sections, the supporting means for the upper section having spaced legs straddling the support for the lower section, pivots for the lower ends of said legs, and frangible means normally preventing the supporting means for the upper section from swinging about said pivots.

8. A machine of the class described comprising a rotary cylinder and a concave cooperating therewith, the concave comprising an upper section and a lower section, independent means supporting said sections, the support for the upper section being movable, frangible means normally retaining the said movable support in operative position with the upper concave section adjacent to the surface of the cylinder, and means limiting movement of said support away from the cylinder when released by breakage of said frangible means.

9. A machine of the class described comprising a rotary cylinder and a concave cooperating therewith, the concave comprising an upper section and a lower section, independent means supporting said sections, the supporting means for the upper and lower sections being independently movable and tending to move away from the cylinder, and means normally holding said supporting means in operative relation to the cylinder, said holding means permitting the supporting means for the respective sections to move away from the cylinder upon intrusion of hard and unyielding material between the cylinder and concave.

10. A machine of the class described comprising a cylinder and a concave, the concave comprising an upper and a lower section, a yoke member supporting each section, each yoke member having spaced upper and lower guides in which its section may slide, an eccentric shaft carried by each yoke member for adjusting its corresponding concave section toward and from the cylinder relatively to the yoke, pivot means supporting each yoke member at a point such that each yoke member tends to fall away from the cylinder, and frangible means for holding the yoke member in normal position.

11. A machine of the class described comprising a frame having spaced side members, a rotary cylinder disposed between said side members, a yoke pivotally supported between said side members, a second yoke having legs straddling the first yoke, and pivotally connected to the side members of the frame, a section of a concave mounted upon each yoke, and means operative to hold the yokes in normal position with the concave sections disposed in operative relation to the cylinder, said holding means permitting movement of the respective yokes away from the cylinder upon intrusion of hard and unyielding material between the cylinder and the concave section.

12. A machine of the class described comprising a rotary cylinder and a concave cooperating therewith, the concave comprising an upper section and a lower section, independent means supporting said sections, said supporting means being pivotally supported at points below their centers of gravity, the radius of movement of the upper section being greater than that of the lower section, a chain for limiting the movement of the upper support, a slotted link limiting movement of the lower section, and frangible means normally holding the concave sections in operative relation to the cylinder.

13. A machine of the class described comprising a rotary cylinder and a concave cooperating therewith, the concave comprising an upper section and a lower section, independent means supporting said sections, the supporting means for each section being pivoted below its center of gravity, the several supporting means being capable of swinging independently and without interference with each other, and bolts normally holding said sections in operative position, the bolts having slender neck portions to permit them to break upon the intrusion of hard and unyielding material between the cylinder and either section of the concave.

Signed by me at Boston, Massachusetts, this 22nd day of January 1926.

ROBERT W. McLEAN.